Jan. 17, 1933.                A. C. DIXON                    1,894,675
                               FUEL TANK
                    Filed April 4, 1931        2 Sheets-Sheet 1
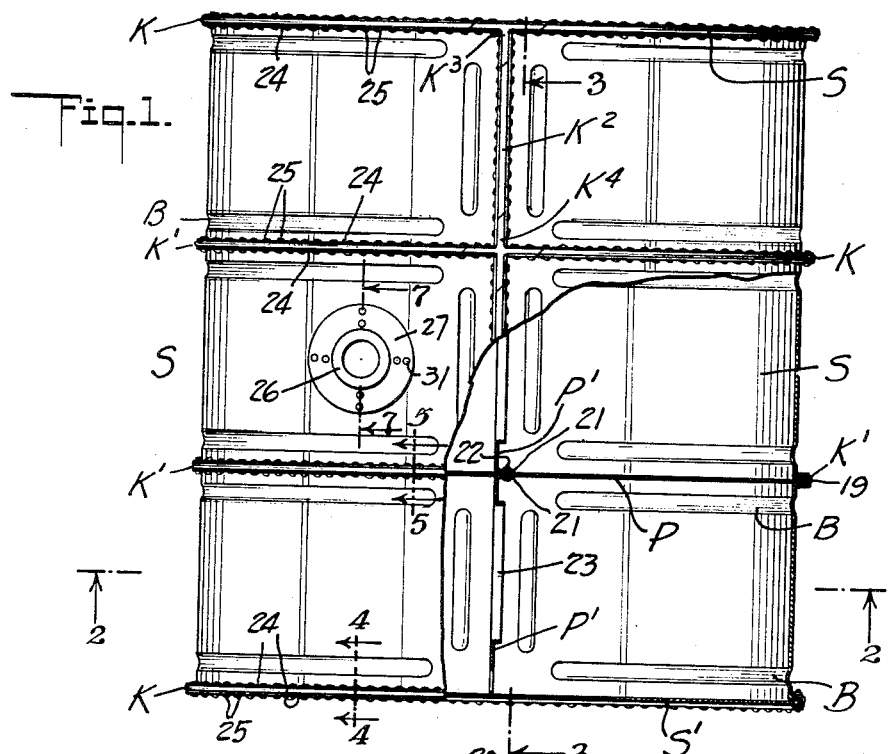
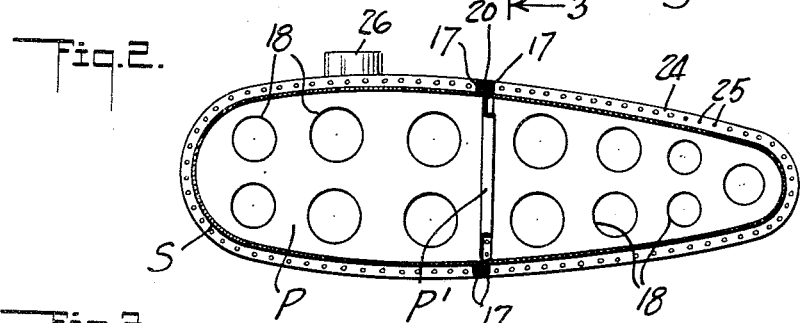
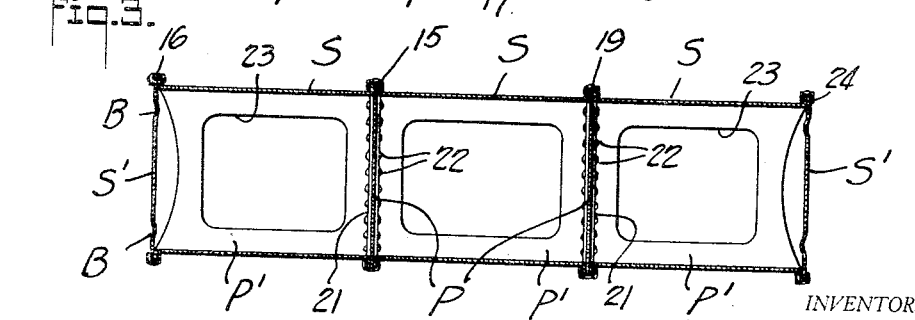
INVENTOR.
ALBERT C. DIXON
BY
ATTORNEYS.

Jan. 17, 1933.  A. C. DIXON  1,894,675
FUEL TANK
Filed April 4, 1931   2 Sheets-Sheet 2
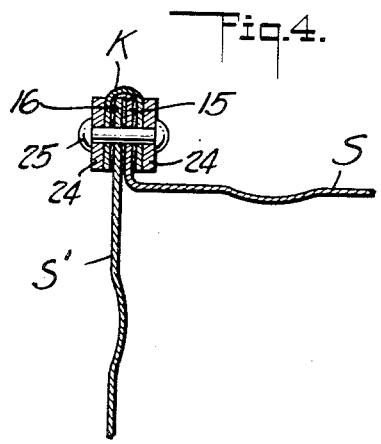
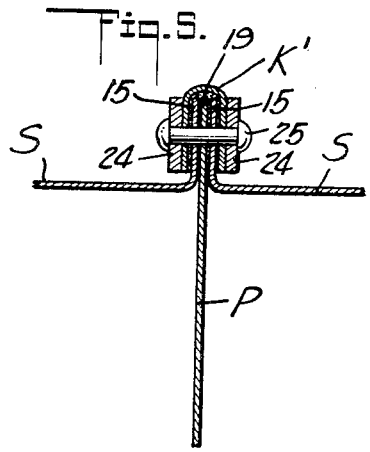
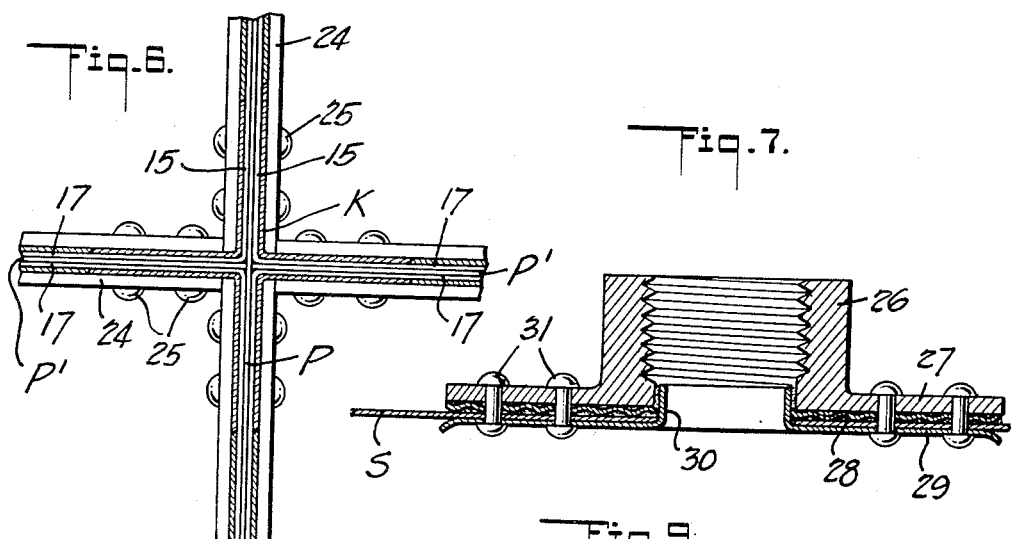
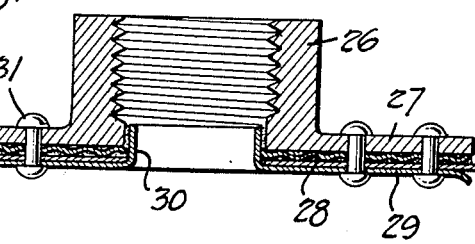
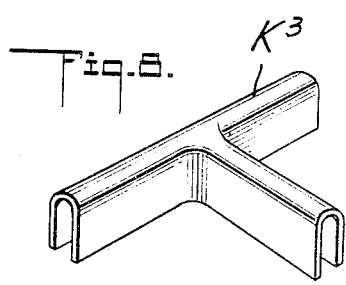
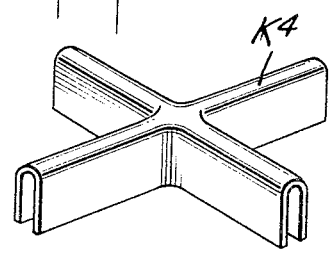
INVENTOR.
ALBERT C. DIXON
BY
ATTORNEYS.

Patented Jan. 17, 1933

1,894,675

UNITED STATES PATENT OFFICE

ALBERT C. DIXON, OF SANTA MONICA, CALIFORNIA

FUEL TANK

Application filed April 4, 1931. Serial No. 527,803.

My invention relates to tanks for storing fluids, and particularly, although not necessarily, to fuel tanks as used on aeroplanes, automobiles, and the like.

It is a purpose of my invention to provide a fuel tank formed of sections having connections therebetween which function to seal the tank against leakage of fuel and particularly gasoline, and wherein the connections embody and are particularly designed to receive a suitable cement insoluble by gasoline for hermetically sealing the joints between the parts of the connections.

It is also a purpose of my invention to provide a fuel tank wherein the connections for the sections are accessible from points exteriorly of the tank to allow them to be opened and additional cement inserted in the event of a slight leakage, and in the event of any one section being cracked, bent, or otherwise damaged, to allow the complete section to be removed for repair or a new section substituted.

It is a further purpose of my invention to provide a fuel tank which possesses the desirable characteristics of strength and durability without appreciable increase in weight of previously designed tanks, thus rendering the tank particularly useful for aircraft.

I will describe only one form of fuel tank embodying my invention and will then point out the novel features thereof in a claim.

In the accompanying drawings:

Figure 1 is a view showing in top plan, with a portion of the top broken away, one form of fuel tank embodying my invention.

Figures 2 and 3 are sectional views taken on the lines 2—2 and 3—3, respectively, of Figure 1.

Figure 4 is an enlarged fragmentary vertical sectional view taken on the line 4—4 of Figure 1, and Figure 5 is a similar view taken on the line 5—5 of Figure 1.

Figure 6 is a fragmentary plan view of the tank at one of the intersecting joints, with the cap strips in horizontal section.

Figure 7 is an enlarged fragmentry sectional view taken on the line 7—7 of Figure 1.

Figures 8 and 9 are detail perspective views of certain of the cap strips.

Similar reference characters refer to similar parts in each of the several views.

Referring specifically to the drawings, my invention in its present embodiment is incorporated in a fuel tank adapted for use on aeroplanes, although it will be understood that the particular shape of the tank is in no wise essential in respect to my invention.

The tank comprises a body made up of a plurality of sections, and where the tank is of the form adapted for use on aeroplanes, the body is made up of a plurality of intermediate sections S and a pair of end sections S'. The intermediate sections are constructed of two sheets of metal bent so as to form upper and lower portions, and the upper portions and the lower portions of the two sheets co-act, respectively, to form the top and bottom of the tank. The end sections S' are formed of single sheets of metal of the required contour, and all of the sections of the tank are formed with beads B at the marginal edges of the metal sheets to allow for expansion and contraction of the metal as is customary in tanks of this character.

All body sections S and S' are associated one with the other to provide flanges 15 and 16, respectively, which extend to the outer side of the body so that the flanges of adjacent sections are in confronting relation to each other, it being noted that the flanges are co-extensive in length with the sheets of metal of which the sections are formed. Thus it will be seen that the flanges of adjacent intermediate sections are in abutting relation to each other at the outer side of the tank body, while the flanges of the end sections S' are in abutting or confronting relation to the corresponding flanges of the intermediate sections.

The intermediate sections S in addition to being formed with the side flanges 15 are also formed with end flanges 17 at the ends of the parts or sheets of metal of which each section is formed. These flanges 17 likewise extend to the outer side of the tank body, and the flanges of one part of an intermediate section are in a confronting relation to the flanges of the other part.

Interiorly of the tank body are arranged two sets of baffle plates provided for the purpose of strengthening the walls of the tank by effectively bracing the latter, and also reducing slushing of the fuel in the tank. The baffle plates of one set are indicated at P and those of the other at P'. The baffle plates P are co-extensive in length with the sections S and S' and are disposed in parallelism to the end sections S'. They are formed with a multiplicity of openings 18, and they are associated with the intermediate sections so that their marginal edges indicated at 19 are disposed between the flanges 15 of adjacent sections, as best illustrated in Figures 5 and 6.

The baffle plates P' are arranged substantially at right angles to the plates P, and each plate P' extends between the latter to the end sections in one instance and from the latter to the end sections S' in the other two instances, although it will be noted that the outer ends of the outer plates P' are concaved, as illustrated in Figure 2. The size of each baffle plate P' is such that its top and bottom marginal edges extend between the corresponding flanges 17 of the intermediate sections, to provide flanges 20, while at the ends of the plates angular flanges 21 are formed on the plates and through these flanges rivets 22 extend for securing the plates to the other baffle plates P. These baffle plates P' are formed of relatively large openings 23 through which the fuel in the tank can circulate, as will be understood.

For closing of the seams or joints between confronting flanges 15, 16, and 17, and the interposed flanges 19 and 20, I provide cap strips preferably formed of metal and of U-form in cross section. There are various forms of cap strips to effectively cover the flanges even at the intersections of the flanges, and as will be clear from a consideration of Figure 1, I provide ovate cap strips K for the flanges of the end sections S', U-shaped cap strips K' for the flanges 15 of the intermediate sections, and linear cap strips K² for a part of the flanges 17. For the end joints, that is where the flanges 17 abut the flanges 16, T-shaped cap strips K³ are provided, the construction of the cap strip being clearly shown in Figure 8. At the intermediate joints between the flanges 15 and 17, I provide cross shaped cap strips K⁴, the integral construction of which is illustrated in Figure 9. In the applied position of any one cap strip, the sides thereof embrace the outer sides of the section flanges 15 or 16, while the intermediate portion of the cap strip is in covering relation to the joint between the flanges. Where the end of one cap strip abuts that of an adjacent cap strip, they are beveled.

For reinforcing the flanges of the sections, I provide bars 24 disposed at opposite sides of the cap strips, with rivets 25 or any other suitable form of fastening member extending through the bars, through the section and baffle plate flanges, as well as the side portions of the cap strips.

In assembling the parts of the tank, the flanges of the body sections and baffle plates are coated with a suitable insoluble metallic cement, and the inner sides of the cap strips are likewise coated. This is done before the body sections are placed in proper position with respect to each other, and before the cap strips are applied. Once the body sections and baffle plates are properly positioned with respect to each other so that the flanges thereof are properly correlated, the cap strips are applied, and subsequently the bars 24, so that by extending the rivets 25 therethrough and heading the same, the flanges and cap strips are squeezed together and thus held so that the joints therebetween are effectively sealed to prevent the escape of fuel contained in the tank. In interposing the marginal edges or flanges of the baffle plates between the flanges of the body sections, the baffle plates are fixedly secured within the tank body and so as to firmly brace the walls of the tank against collapsing.

From the preceding description, it will be manifest that I have provided a fuel tank in which all joints between the body section thereof are accessible from the outer side of the tank so that in the event of leakage, the particular joint can be quickly opened and more cement introduced to prevent further leakage. Access to any joint can be readily had by removing the rivets, the bars, and the cap strips. In the event of damage of any section of the tank body, it can be removed for repair, or a new section substituted.

In Figure 7 is shown a filling spout 26 provided at its base with a flange 27 disposed at the outer side of the tank body. Between the tank body and the flange is interposed a corrugated metal gasket 28, while to the inner side of the tank and opposite to the gasket is a stiffening plate 29. This plate is provided with a central opening formed with an upwardly extending collar 30 which spans the joints at the inner portions of the flange, gaskets and tank body. Rivets 31 are extended through the flange, gasket, tank body, and stiffening plate, for drawing these elements together and securely holding them together.

In practice, I use a suitable insoluble metallic cement which is interposed between the gasket and the flange, and the gasket and the tank body so that once the rivets are applied to draw the elements together, the cement will serve to form a fluid tight joint between the tank body and the filling spout.

Alhough I have herein shown and described only one form of fuel tank embodying my invention, it is to be understood that various changes and modifications may be made therein without departing from the spirit of the invention and the spirit and scope of the appended claim.

I claim:

A tank comprising: a body composed of sections having edge flanges extending outwardly of the body and being unbroken at the corners of the sections, with the flanges of adjacent sections confronting each other; baffle plates in the body having their marginal edges disposed between the confronting flanges and being arranged in intersecting relation at the corners of the sections; U-section cap strips embracing the flanges and being integral at the corners of the sections; bars extending along the outer sides of the cap strips; fastening members extending through the bars, cap strips, flanges and baffle plates; and a film of cement coating and baffle plates, flanges and cap strips for sealing the joints between them.

ALBERT C. DIXON.